United States Patent
Citta

Patent Number: 5,283,653
Date of Patent: Feb. 1, 1994

[54] DUAL HDTV/NTSC RECEIVER USING SEQUENTIALLY SYNTHESIZED HDTV AND NTSC CO-CHANNEL CARRIER FREQUENCIES

[75] Inventor: Richard W. Citta, Oak Park, Ill.

[73] Assignee: Zenith Electronics Corp., Glenview, Ill.

[21] Appl. No.: 887,624

[22] Filed: May 22, 1992

[51] Int. Cl.$^5$ .............................................. H04N 5/46
[52] U.S. Cl. ...................................... 348/725; 348/735; 348/441
[58] Field of Search ............... 358/14 D, 11, 141, 188, 358/167, 191.1, 195.1; 375/99, 102; H04N 5/46

[56] References Cited

U.S. PATENT DOCUMENTS

| | | | |
|---|---|---|---|
| 4,800,426 | 1/1989 | Glenn | 358/191.1 |
| 4,860,090 | 8/1989 | Murata et al. | 358/11 |
| 4,975,775 | 12/1990 | Satoh | 358/191.1 |
| 5,014,350 | 5/1991 | Nezu | 358/191.1 |
| 5,121,208 | 6/1992 | Citta et al. | 358/167 |
| 5,132,793 | 7/1992 | Hirahata et al. | 358/12 |

FOREIGN PATENT DOCUMENTS

| | | | |
|---|---|---|---|
| 0149686 | 6/1989 | Japan | H04N 5/46 |
| 0113781 | 4/1990 | Japan | H04N 5/46 |

*Primary Examiner*—James J. Groody
*Assistant Examiner*—Jeffrey S. Murrell
*Attorney, Agent, or Firm*—Jack Kail

[57] ABSTRACT

A dual HDTV/NTSC receiver includes a microprocessor for controlling a tuner for synthesizing the carrier frequencies of HDTV signals and NTSC signals. The HDTV signals are inherently of much lower power than the NTSC signals. The tuner initially synthesizes the carrier frequency of a desired HDTV signal which is attempted to be detected in an narrow band synchronous detector. Detection of the HDTV signal produces a high lock detect signal which causes the microprocessor to enable an HDTV processing channel. If no HDTV signal is detected, the lock detect signal remains low and the microprocessor controls the tuner for synthesizing the carrier frequency of the NTSC co-channel television signal. A high lock detect signal from the narrow band synchronous detector, indicating detection of the NTSC co-channel causes the microprocessor to enable the NTSC processing channel. A system for automatically programming the receiver and memorizing which type signal is present on each television channel is also shown.

8 Claims, 4 Drawing Sheets

DUAL HDTV/NTSC RECEIVER USING SEQUENTIALLY SYNTHESIZED HDTV AND NTSC CO-CHANNEL CARRIER FREQUENCIES

CROSS REFERENCE TO RELATED APPLICATION

This application is related to U.S. Pat. No. 5,087,975, entitled VSB HDTV TRANSMISSION SYSTEM WITH REDUCED NTSC CO-CHANNEL INTERFERENCE, in the names of R. Citta, D. Mutzabaugh and G. Sgrignoli, and U.S. Pat. No. 5,173,774, entitled DUAL PURPOSE HDTV/NTSC RECEIVER, in the names of W. Bretl and P. Snopko, both assigned to Zenith Electronics Corporation.

BACKGROUND OF THE INVENTION AND PRIOR ART

This invention relates generally to an HDTV receiver and particularly to an HDTV receiver that is also capable of receiving NTSC signals.

In the recently announced Digital Spectrum Compatible High Definition Television System (DSC/HDTV) jointly developed by Zenith Electronics Corporation and AT&T Corporation, spectrum compatibility with co-channel NTSC signals is achieved. Because of the digital nature of the HDTV signal, it is of inherently lower power and the ratio of the HDTV signal power to the NTSC signal power is very low, on the order of 14 dB. In the case of a receiver situated between an HDTV service area and an NTSC service area, the desirable to undesirable signal power ratio for the NTSC signal is about 28 dB and for the HDTV signal is about 0 dB. It is planned that all HDTV receivers will be capable of receiving both HDTV signals and NTSC signals. The present invention is directed to a dual HDTV/NTSC television receiver that automatically selects the appropriate signal when tuned to a "television channel."

In the presently proposed all digital DSC/HDTV system, the video source signal has 787.5 lines per frame, 59.94 frames per second and is progressively scanned at 47,203 Hz (three times the NTSC rate) and has a 34 MHz bandwidth. The aspect ratio is 16:9 and there are 1280×720 active pixels in a frame, with the pixels being square. 1575 lines are displayed in 1/29.97 seconds. The HDTV signal has a NTSC like transmission format with one HDTV data frame corresponding in time to one NTSC field. There are also HDTV data fields and HDTV data segments that correspond to NTSC fields and NTSC horizontal lines, although there is no correlation between the HDTV data fields and data segments and NTSC fields and NTSC horizontal lines, respectively, on an individual basis. The HDTV signal has a suppressed carrier and is transmitted with a small pilot to aid in channel acquisition. The spectrum of the HDTV transmitted signal is shown in FIG. 1 with the corresponding carriers of the HDTV and a co-channel NTSC signal illustrated therein. The response curve has a flat portion 32 situated between a Nyquist slope 34, 36 at each end, with the HDTV carrier frequency being positioned 895 KHz from the NTSC picture carrier. This frequency distance is Fcs/4, where Fcs equals 3.58 MHz. The transmitter for the HDTV suppressed carrier arrangement is fully disclosed in U.S. Pat. No. 5,087,975, mentioned above.

OBJECTS OF THE INVENTION

A principal object of the invention is to provide a novel HDTV/NTSC receiver.

Another object of the invention is to provide a method of receiving both HDTV and NTSC signals.

A further object of the invention is to provide a method and apparatus for reliably detecting an HDTV signal in the presence of a strong NTSC co-channel signal.

BRIEF DESCRIPTION OF THE DRAWINGS

These and other objects and advantages of the invention will be apparent upon reading the following description in conjunction with the drawings, in which:

FIG. 5 is a RAM table illustrating a simple memory arrangement for the tuning system defined by the flow chart of FIG. 4.

DESCRIPTION OF THE PREFERRED EMBODIMENT

Figure 1:
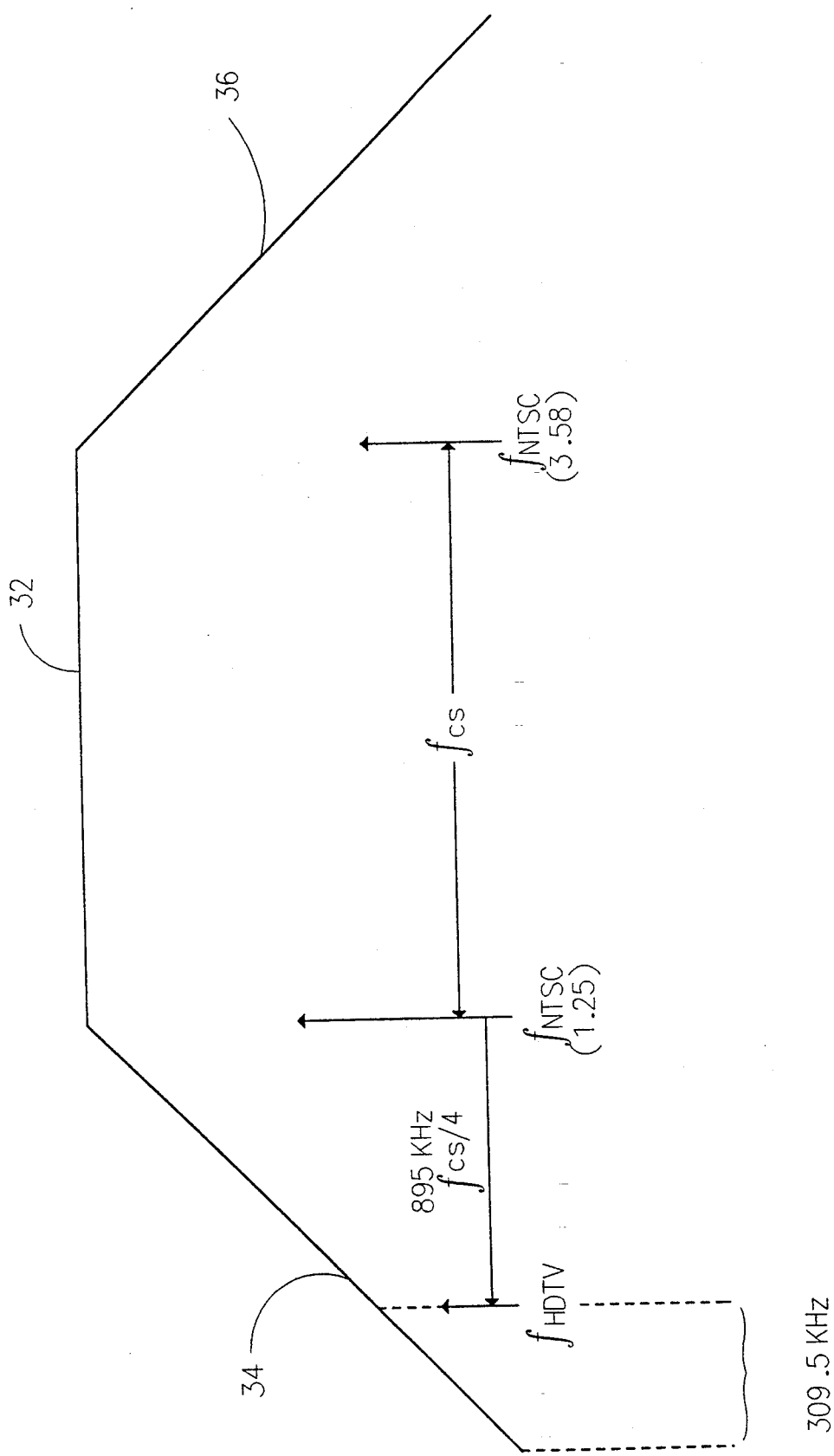
FIG. 1 illustrates the spectrum of a 6 MHz HDTV television channel showing placement of the HDTV and NTSC co-channel carriers therein.
Figure 2:
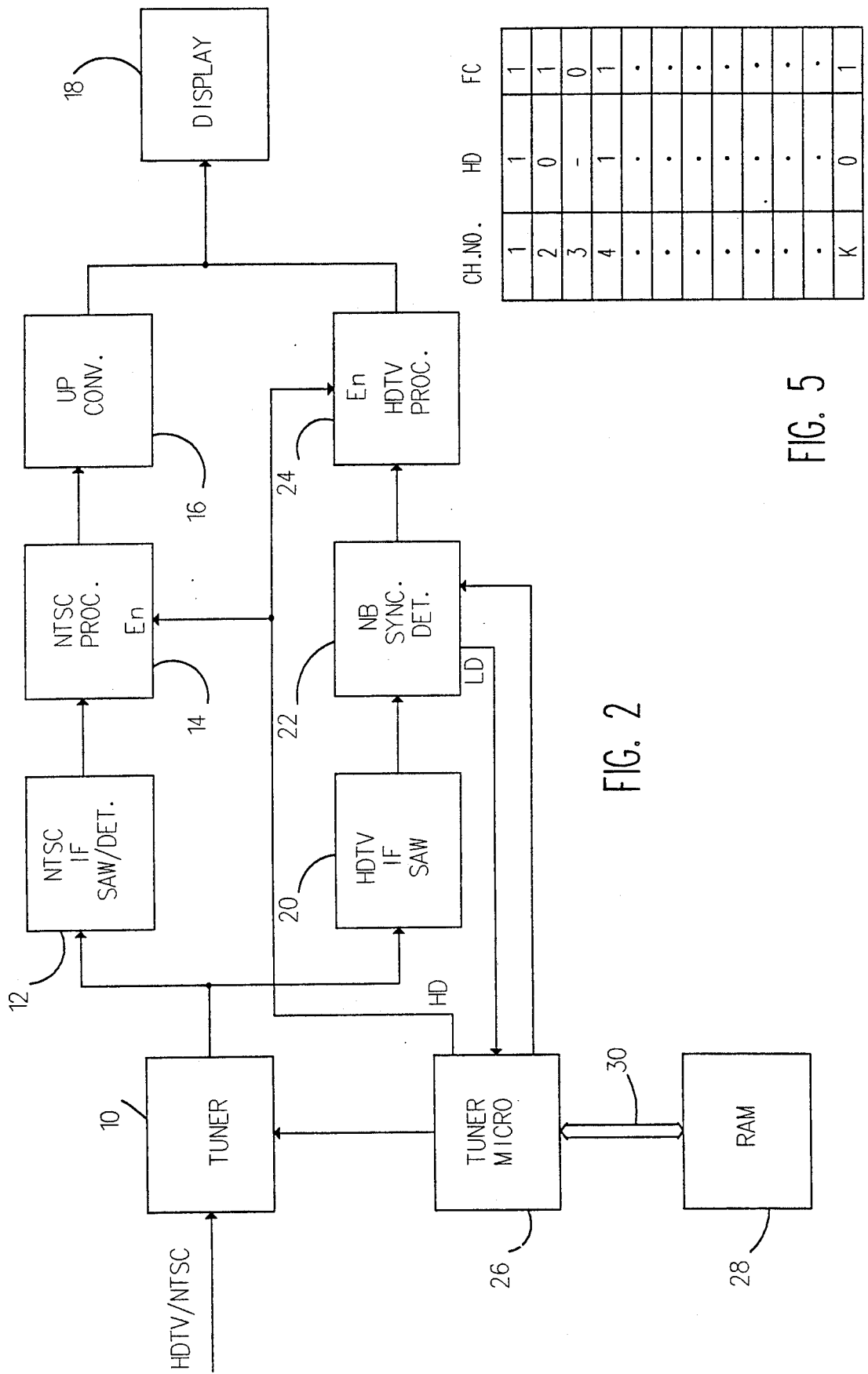
FIG. 2 is a partial block diagram of a dual channel receiver constructed in accordance with the invention.

FIG. 1, showing the spectrum of a 6 MHz HDTV television channel, including the carrier frequencies of an HDTV signal and an NTSC co-channel signal, was discussed above. In FIG. 2, a tuner 10 is shown as being capable of receiving either or both an HDTV signal and an NTSC signal. Tuner 10 is coupled to an NTSC IF SAW filter and detector 12 which in turn supplies an NTSC processing means 14 that is coupled to a scan upconverter which may be constructed in accordance with U.S. Pat. No. 5,173,774 and which in turn is coupled to a video display 18. Tuner 10 is also coupled to an HDTV IF SAW filter 20 which in turn supplies a narrow band synchronous detector 22 that provides an output to an HDTV processing means 24, the output of which is coupled to display 18. A tuner microprocessor 26 is coupled to tuner 10 and supplies logic signals for controlling the development of appropriate synthesized frequencies for receiving and detecting the gamut of HDTV channel signals and NTSC channel signals. A RAM memory 28, coupled to microprocessor 26 over a bidirectional communication link 30, stores information concerning the type of signal, if any, received on each different television channel. Tuner microprocessor 26 is also coupled to synchronous detector 22 for supplying an appropriate signal for "centering" the detector in the event no lock signal (LD=0) is generated after a predetermined time period. In that event, i.e. no HDTV signal is detected, tuner microprocessor 26 supplies an appropriate logic signal to tuner 10 to cause synthesis of the NTSC co-channel of the HDTV channel signal. Synchronous detector 22 again tries to lock to the NTSC co-channel. A high lock detect (LD) signal is produced by synchronous detector 22 when either an HDTV or an NTSC signal has been detected. The lock detect signal is provided to the microprocessor 26 which in turn supplies an HD signal for application to the enable inputs of NTSC processing means 14 and HDTV processing means 24 for selectively enabling these processing means. The HD signal is essentially a switching voltage, having a logic level of "1" when an HDTV signal is received and a logic level of "0" for NTSC signals, which turns on the appropriate one of NTSC processing means 14 and HDTV processing means 24.

It should be noted that the synchronous detector 22, which produces the lock detect signal LD, is in the HDTV signal processing path. Because the desired to undesired signal ratio (due to the inherently low power HDTV signal) makes even a relatively weak NTSC co-channel signal appear formidable, the receiver of the invention is programmed to initially look for the low power HDTV signal. If an HDTV signal is detected, a high level lock detect signal LD is generated and supplied to tuner microprocessor 26 which then enables HDTV processor 24 with a high level HD signal. NTSC processing means 14 remains disabled. The detection is achieved by tuner microprocessor 26 controlling tuner 10 for synthesizing the carrier frequency of the HDTV signal for the particular television channel. If the lock detect signal LD produced is low, tuner microprocessor 26 controls tuner 10 for synthesizing the NTSC carrier signal for the particular television channel. The state of the lock detect signal LD indicates to microprocessor 26 when a signal has been detected and therefore when to enable the appropriate one of NTSC processing means 14 and HDTV processing means 24.

Figure 3:
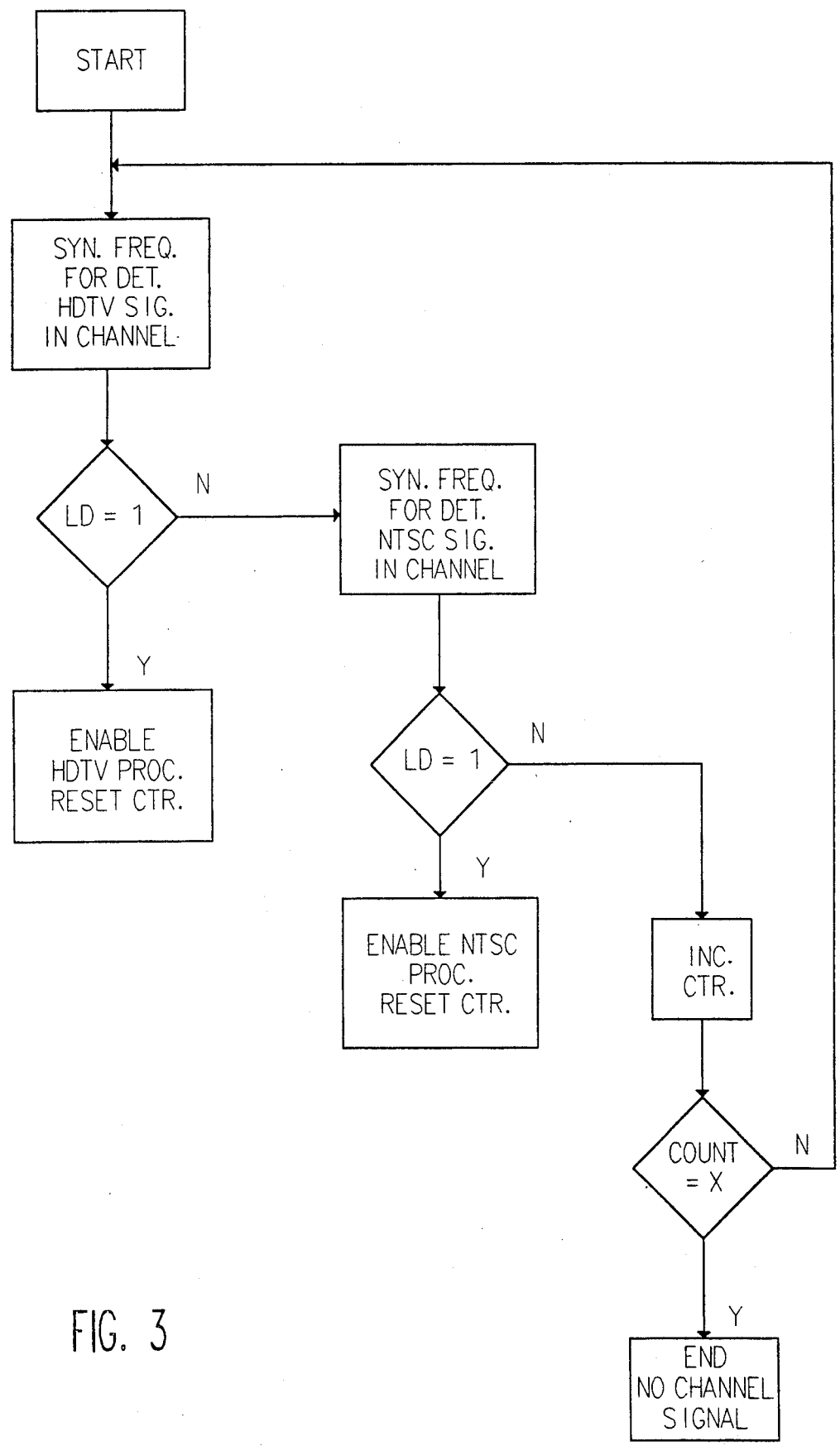
FIG. 3 is a flow chart indicating the acquisition procedure for tuning channels with the receiver of FIG. 2.

The flow chart of FIG. 3 illustrates this process. Initially the frequency for the HDTV signal in the selected television channel is synthesized. The state of the LD signal is interrogated and if it is high, the HDTV processing means are enabled. If the LD signal is low, the frequency for detecting the NTSC signal in the television channel is synthesized. The LD signal is again interrogated and if it is high, indicating detection of a signal by synchronous detector 22, the NTSC processing means are enabled. If the LD signal remains low, no NTSC signal has been detected either. In this case, a counter is incremented to assure repetition of the process a sufficient number of times to produce reliable operation in the presence of noise and the like. If after an appropriate number of counts, neither an HDTV nor an NTSC signal has been detected, the process is stopped with no television signal being received, which is similar to tuning to a vacant television channel.

Figure 4:
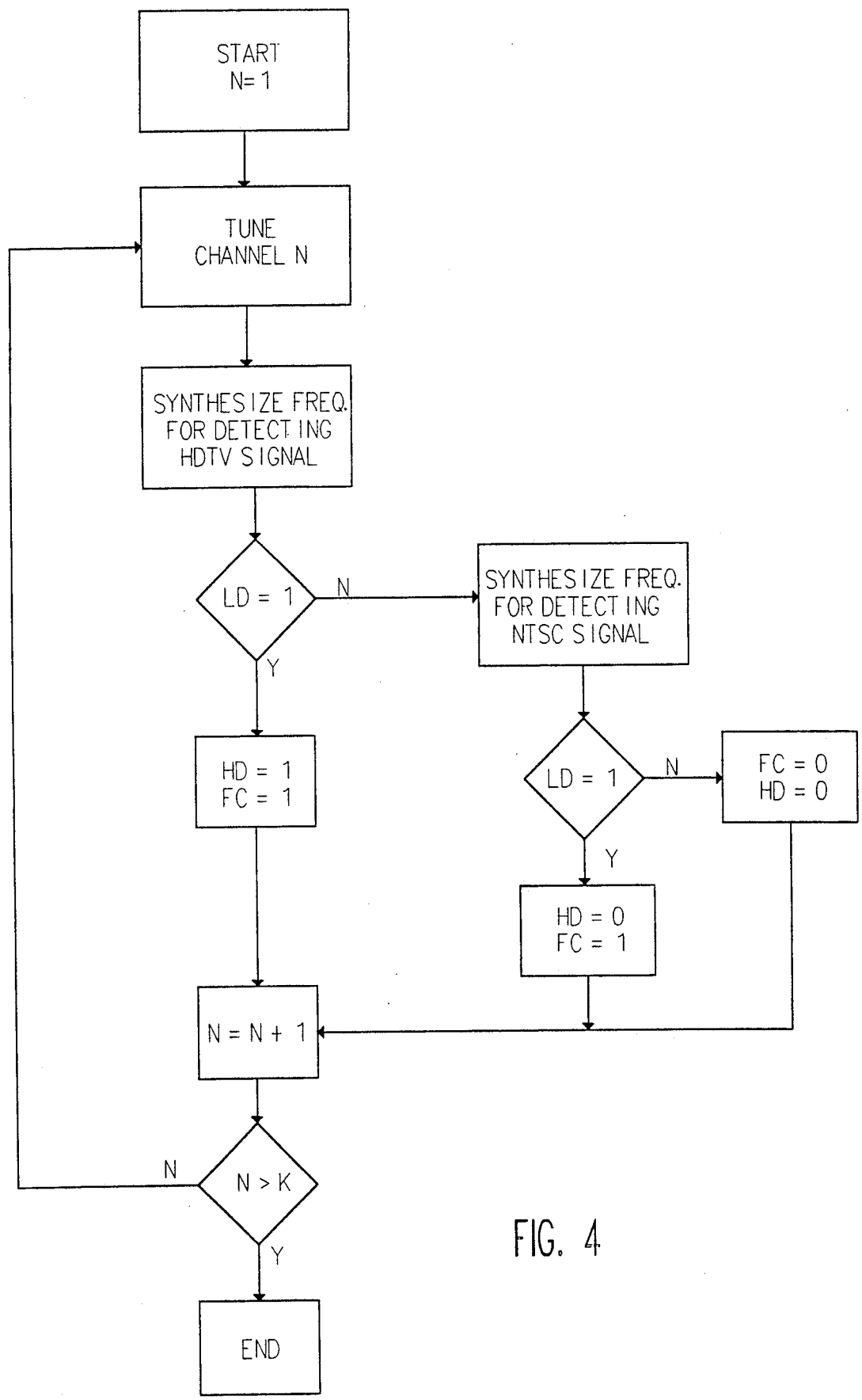
FIG. 4 is a flow chart of an automatic programming system for a dual receiver constructed in accordance with FIG. 2.

In the autoprogramming mode illustrated by the flow chart of FIG. 4, the television channels are sequenced (by number) automatically with the HDTV signal being initially tested for with a synthesized HDTV carrier. If found, a memory bit HD is set in RAM 28 (FIGS. 2 and 5) to indicate that television channel has an HDTV signal. An FC (favorite channel) bit in the RAM table of FIG. 5 is also set to 1 to denote that a signal has been found on that television channel. If no HDTV signal is found, the NTSC co-channel carrier frequency is synthesized and the test is repeated. If the television channel is found to have an NTSC signal, the RAM memory is appropriately marked with an HD bit of 0, an FC bit of 1 is marked and the next television channel is tested. If neither an HDTV or an NTSC signal is present, the RAM memory is marked with an FC bit equal to 0 and the next television channel is tested in sequence. In this manner, the entire spectrum of television channels can be automatically tested for the presence or absence of HDTV and NTSC signals and, if one is present, an HDTV or NTSC identification bit and a favorite channel (FC) bit set in the RAM memory to automatically select the appropriate one of the HDTV and NTSC processing means whenever that television channel number is subsequently selected. The illustration of FIG. 5 indicates an HDTV signal on channels 1 and 4, an NTSC signal on channels 2 and K and no signal on channel 3. It will be appreciated that the autoprogramming feature is ancillary to the basic aspect of the invention as disclosed in the flow chart of FIG. 3.

What has been described is a novel dual television receiver that is capable of automatically receiving either HDTV or NTSC spectrum compatible television signals.

What is claimed is:

1. A method of operating a dual HDTV/NTSC television signal receiver, the HDTV television signals being inherently of lower power than the NTSC signals, comprising:
   synthesizing the carrier frequency of a desired one of said HDTV signals; and
   demodulating said one HDTV signal using said synthesized HDTV carrier frequency;
   if said one HDTV signal is not properly demodulated, then
   synthesizing the carrier frequency of the NTSC co-channel of said one HDTV signal; and
   demodulating said NTSC co-channel using the synthesized NTSC co-channel frequency.

2. The method of claim 1 wherein said demodulating of said one HDTV signal is accomplished with a narrow band synchronous detector.

3. The method of claim 2 wherein said receiver includes HDTV and NTSC processing channels, and wherein said demodulating of said NTSC co-channel si also accomplished with said narrow band synchronous detector.

4. A method of comprising a dual HDTV/NTSC television receiver, the HDTV signals being inherently of lower power then the NTSC signals, comprising:
   initially processing a received television signal with a synthesized carrier corresponding to a desired one of said HDTV signals;
   developing an indicating signal denoting the presence or absence of said one HDTV signal;
   enabling further processing of said one HDTV signal responsive to said indicating signal denoting the presence of said one HDTV signal; and
   synthesizing a carrier corresponding to an NTSC co-channel signal of said one HDTV signal and enabling processing of said co-channel NTSC signal responsive to said indicating signal denoting the absence of said one HDTV signal.

5. The method of claim 4 wherein said indicating signal is produced by the lock-up of a narrow band synchronous detector.

6. The method of automatically programming a receiver capable of receiving either HDTV or NTSX signals in the same television channel, with the HDTV signals being lower in power than the NTSC signals, comprising:
   for each television channel,
   initially attempting to detect an HDTV signal in said television channel and, if no HDTV signal is detected, subsequently attempting to detect and NTSC signal in said television channel, using synthesized carrier frequencies for said HDTV signals and said NTSC signals, respectively; and noting in a memory the type of signal detected for each said television channel.

7. A receiver for selectively receiving HDTV and NTSC television signals in a plurality of television channels, the HDTV signals being inherently lower in power than the NTSC signals, comprising:

HDTV signal processing means;

NTSC signal processing means;

means operable for initially synthesizing the carrier frequency of a desired one of said HDTV signals;

means subsequently operable for synthesizing the carrier frequency of an NTSC co-channel signal corresponding to said one HDTV signal;

means including a narrow band synchronous detector for detecting said one HDTV signal and said NTSC co-channel signal in response to said initially and subsequently synthesized carrier frequencies, respectively;

said narrow band synchronous detector developing a lock detect signal indicative of detection of said one HDTV signal or said NTSC co-channel signal by said narrow band detector; and means for selectively enabling a corresponding one of said HDTV signal processing means and said NTSC signal processing means responsive to development of said lock detect signal.

8. The receiver of claim 7, further including microprocessor means for controlling said synthesizing of said carrier frequency signals, said microprocessor means also including said selectively enabling means for providing enable signals to selectively activate said HDTV and said NTSC signal processing means responsive to development of said lock detect signal.

* * * * *